United States Patent [19]

Ohata et al.

[11] Patent Number: 4,708,946

[45] Date of Patent: Nov. 24, 1987

[54] CATALYST FOR PURIFYING EXHAUST GAS

[75] Inventors: Tomohisa Ohata, Himeji; Sadao Terui, Hyogo; Eiichi Shiraishi, Himeji, all of Japan

[73] Assignee: Nippon Shokubai KagAKU Kogyo Co., Ltd., Osaka, Japan

[21] Appl. No.: 865,882

[22] Filed: May 21, 1986

[30] Foreign Application Priority Data

May 23, 1985 [JP] Japan .................................. 60-109372
Jun. 26, 1985 [JP] Japan .................................. 60-137784

[51] Int. Cl.$^4$ ........................ B01J 21/04; B01J 23/10; B01J 23/40
[52] U.S. Cl. .................................. 502/304; 423/213.5
[58] Field of Search ....................... 502/304; 423/213.5

[56] References Cited

U.S. PATENT DOCUMENTS

| 4,206,087 | 6/1980 | Keith et al. | 502/304 |
| 4,331,565 | 5/1982 | Schaefer et al. | 502/304 |
| 4,587,231 | 5/1986 | Sawamura et al. | 502/304 |

Primary Examiner—W. J. Shine
Attorney, Agent, or Firm—Omri M. Behr

[57] ABSTRACT

A catalyst for purifying exhaust gas, having deposited on a monolithic honeycomb carrier a catalyst composition comprising an alumina-modified cerium oxide obtained by impregnating a water-insoluble cerium compound with at least one member selected from the group consisting of water-soluble aluminum compounds and alumina hydrates and calcining the product of impregnation, at least one precious metal selected from the group consisting of platinum, palladium, and rhodium, and active alumina.

25 Claims, No Drawings

CATALYST FOR PURIFYING EXHAUST GAS

BACKGROUND OF THE INVENTION

1. Field of the Invention

This invention relates to a catalyst for purifying exhaust gas. More particularly, this invention relates to a catalyst for removing hydrocarbons (hereinafter referred to simply as "HC"), carbon monoxide (hereinafter referred to simply as "CO"), and nitrogen oxides (hereinafter referred to simply as "NOx"), which are noxious components contained in the exhaust gas. To be still more specific, this invention relates to a catalyst for purifying the exhaust gas, which enables HC, CO, and NOx contained in the exhaust gas to be simultaneously removed efficiently at a low temperature while an internal combustion engine is being operated with the air/fuel (A/F) ratio controlled near the stoichiometric equivalent point.

2. Description of Prior Art

Heretofore, numerous catalyst have been proposed for purifying the exhaust gas emanating from the internal combustion engine such as of an automobile. At present, three way catalysts capable of simultaneously removing CO, HC and NOx are predominant over other catalysts.

Any of the aforementioned catalysts for purifying the exhaust gas is composed mainly of a carrier and a catalytically active seed. As the catalytically active species, such precious metals as platinum (Pt), palladium (Pd), and rhodium (Rh) are chiefly used. For the purpose of accelerating and stabilizing the catalytic activity of such precious metals, compounds selected from the compounds of such rare earth metals as cerium, lanthanum, and praseodymium, the compounds of such Group VIII elements as iron, cobalt, and nickel, the compounds of such alkali metals as sodium, potassium, and cesium, and the compounds of such alkaline earth metals as barium and calcium are generally used. Among other compounds enumerated above, the oxides of cerium prove particularly useful.

It is said that the oxides of cerium generally have an effect of oxygen storage, an effect of promoting the water gas shift reaction, an effect of enhancing the dispersibility of a precious metal, and an effect of improving thermal stability. How these oxides of cerium are to be effectively utilized constitutes itself a very important problem.

In recent year, since the temperature of the exhaust gas from the automobile is tending downwardly because of the efforts devoted to economizing the fuel consumed in the automobile, a need has developed for three way catalyst which excels in ability to effect removal of CO, HC and NOx from the exhaust gas at low temperatures. As means of depositing a given precious metal on the conventional rhodium-containing honeycomb catalyst used for purifying the exhaust gas, there have been proposed a method which effects the deposition by coating three way honeycomb carrier with active alumina and then impregnating the coated carrier with the precious metal solution and a method which effects the deposition by impregnating active alumina pellets with the precious metal solution. In either of the methods, the rhodium is deposited by impregnated simultaneously with at least one precious metal (a) selected from the group consisting of platinum and palladium. Thus, the rhodium which is required to be used in a limited minute amount cannot be dispersed and deposited in the optimum state. As the result, the acquisition of satisfactory catalytic activity has been unsuccessful.

In the specification of U.S. Pat. No. 4,283,308 is disclosed a method which causes a precious metal (a) and rhodium to be deposited independently of each other on alumina pellets. By this method, the precious metal is distributed solely on the surface of alumina pellets about 3 mm in diameter.

Methods which effect the deposition of a precious metal (a) on a carrier in the form of pellets by using a solution of the precious metal (a) which additionally incorporates a polybasic carboxylic acid are disclosed in the specification of U.S. Pat. No. 3,259,454, the specification of Japanese Patent Publication No. SHO 59(1984)-33,019, and the specification of Japanese Patent Laid-open No. SHO 51(1976)-21,592. These methods invariably cause the precious metal (a) to be distributed within alumina pellets 2 to 4 mm in diameter. The specification of Japanese Patent Laid-open SHO 59(1984)-154,139 discloses a method which effects simultaneous deposition of Pt, Pd, and Rh on a monolithic honeycomb carrier by immersing the carrier in a solution of the precious metals which additionally incorporates therein an organic acid. Similarly to the method using a carrier in the form of pellets, this method causes the precious metals to be distributed within the active coating applied on the honeycomb carrier. These conventional methods invariably consist in forming an ununiform concentration distribution of a given precious metal (a) within pellets of the carrier or within the active coating deposited on the honeycomb carrier.

An object of this invention, therefore, is to improve the function of cerium oxide which has been finding growing recognition as an essential component for the catalyst used for purifying the exhaust gas.

Another object of this invention is to provide a catalyst for purifying the exhaust gas which has the CO conversion improved and the A/F region in which CO, HC, and NOx are simultaneously removed in high levels, i.e. the window width, broadened by enhancing the effect of cerium oxide in oxygen storage and in promoting the water gas shift reaction.

Yet another object of this invention is to provide a catalyst for purifying the exhaust gas which, by improving the method for the deposition of a precious metal on active alumina, is enabled to exhibit an excellent ability to remove CO, HC, and Nox at low temperatures.

A further object of this invention is to provide a method for manufacture of the catalyst for purifying the exhaust gas which excels in low-temperature activity.

SUMMARY OF THE INVENTION

The objects of this invention mentioned above are accomplished by a catalyst for purifying the exhaust gas which is produced by depositing on a monolithic honeycomb carrier a catalyst composition comprising an alumina-modified cerium oxide obtained by impregnating a water-insoluble cerium compound with at least one compound selected from the group consisting of water-soluble aluminum compounds and alumina hydrates and calcining the resulting impregnation product, at least one precious metal selected from the group consisting of platinum, palladium, and rhodium, and active alumina.

The present invention embraces the following embodiments.

(1) A catalyst for purifying the exhaust gas, whose catalyst composition is a mixture comprising of at least one precious metal selected from the group consisting of platinum, palladium, and rhodium, active alumina, and an alumina-modified cerium oxide.

(2) A catalyst for purifying the exhaust gas, whose catalyst composition is a mixture comprising of at least one precious metal selected from the group consisting of platinum and palladium, active alumina having rhodium dispersed and deposited thereon in advance, and an alumina-modified cerium oxide.

(3) A catalyst for purifying the exhaust gas, whose catalyst composition is a mixture comprising of active alumina having rhodium dispersed and deposited thereon in advance and further having at least one precious metal selected from the group consisting of platinum and palladium dispersed and deposited thereon and an alumina-modified cerium oxide.

(4) A catalyst for purifying the exhaust gas, whose catalyst composition is a mixture comprising of active alumina having at least one precious metal selected from the group consisting of platinum and palladium dispersed and deposited thereon in advance, rhodium, and an aluminamodified cerium oxide.

(5) A catalyst for purifying the exhaust gas, whose catalyst composition is a mixture comprising of active alumina having at least one precious metal selected from the group consisting of platinum and palladium dispersed and deposited thereon in advance and further having rhodium dispersed and deposited thereon, and an alumina-modified cerium oxide.

(6) A catalyst for purifying the exhaust gas, whose catalyst composition is a mixture comprising of activate alumina having at least one precious metal selected from the group consisting of platinum, palladium, and rhodium dispersed and deposited thereon in advance and an alumina-modified cerium oxide.

(7) A catalyst for purifying the exhaust gas, whose catalyst composition is a mixture comprising of an alumina-modified cerium oxide having rhodium dispersed and deposited thereon in advance, active alumina, and at least one precious metal selected from the group consisting of platinum and palladium.

(8) A catalyst for purifying the exhaust gas, whose catalyst composition is a mixture comprising of an alumina-modified cerium oxide having rhodium dispersed and deposited thereon in advance and active alumina having at least one precious metal selected from the group consisting of platinum and palladium dispersed and deposited thereon.

(9) A catalyst for purifying the exhaust gas, whose catalyst composition is a mixture comprising of an alumina-modified cerium oxide having at least one precious metal selected from the group consisting of platinum and palladium dispersed and deposited thereon in advance, active alumina, and rhodium.

(10) A catalyst for purifying the exhaust gas, whose catalyst composition is a mixture comprising of an alumina-modified cerium oxide having at least one precious metal selected form the group consisting of platinum and palladium dispersed and deposited thereon in advance and active alumina having rhodium dispersed and deposited thereon in advance.

(11) A catalyst for purifying the exhaust gas, whose catalyst composition is a mixture comprising of an alumina-modified cerium oxide having rhodium dispersed and deposited thereon in advance and further having a precious metal selected from the group consisting of platinum and palladium dispersed and deposited thereon and active alumina.

(12) A catalyst for purifying the exhaust gas, whose catalyst composition is a mixture comprising of an alumina-modified cerium oxide having a precious metal selected from the group consisting of platinum and palladium dispersed and deposited thereon in advance and further having rhodium dispersed and deposited thereon and active alumina.

In the catalysts enumerated above, the catalysts of (1), (3), and (5) prove particularly desirable and those of (3), (5), (7) and (8) manifest outstanding effects. In the catalysts of (3) and (5), when the deposition of a given precious metal on active alumina powder is carried out either (a) by first causing rhodium to be dispersed and deposited fast on the active alumina powder and subsequently causing at least one precious metal selected from the group consisting of platinum and palladium to be dispersed and deposited fast thereon or (b) by causing the aforementioned precious metal to be dispersed and deposited fast on the active alumina powder and subsequently causing rhodium to be dispersed and deposited fast thereon, the precious metal, particularly rhodium which is required to be used in a limited minute amount can be maintained as dispersed in high uniformity. In the catalysts of (7) and (8), by causing rhodium to be dispersed and deposited fast on the alumina-modified cerium oxide, the outstanding ability of the alumina-modified cerium oxide to enhance the oxygen storage and promote the water gas shift reaction is enabled to be exerted effectively on rhodium and, at the same time, the thermal stability of rhodium is enhanced.

PREFERRED EMBODIMENT OF THE INVENTION

The catalyst composition to be used in the catalyst of this invention for purifying the exhaust gas can be manufactured by any of the methods indicated in (1) through (12) above.

As typical examples of the water-insoluble cerium compound to be used in the catalyst composition, cerium oxide, cerium hydroxide, cerium carbonate, may be cited. Among other cerium compounds, cerium carbonate proves particularly desirable. These water-insoluble cerium compounds are used in a finely divided form. The particles of the finely divided cerium compound have diameters in the range of 0.1 to 100 microns. As typical examples of watersoluble aluminum compounds and/or alumina hydrates, there may be cited aluminum nitrate, aluminum chloride, aluminum sulfate, gypsite, bayerite, boehmite, alumina gel, and alumina sol. Among these compounds enumerated above, aluminum nitrate proves particularly desirable.

The proportions in which the water-insoluble cerium compound and the water-soluble aluminum compound and/or alumina hydrate are used are not specifically defined. Their usage results in the production of cerium oxide which has been effectively modified with alumina. Desirably, these compounds are used in proportions such that the atomic ratio of cerium to aluminium, Ce/Al, will fall in the range of from 1 to 20, preferably from 2 to 10. After the water-insoluble cerium compound has been impregnated with the water-soluble aluminum compound and/or alumina hydrate, the wet mixture is generally dried at a temperature in the range of 100° to 300° C., and then calcined in the air at a temperature in the range of 300° to 700° C. to give rise to an alumina-modified cerium oxide. Since the oxide so produced structurally possesses more lattice defects than the ordinary cerium oxide, it exhibits a greater ability to store oxygen and promotes the water gas shift reaction. As the result, the catalyst's functions such as the effect of storing oxygen and the effect of promoting the water gas shift reaction are improved and its ability to remove CO, HC, and Nox is notably improved and its window width is expanded as compared with the conventional catalyst using an ordinary cerium oxide.

The active alumina to be used in this invention is desired to be of a grade having a specific surface in the range of 50 to 180 m$^2$/g. It may assume any of the crystal forms $\gamma$, $\delta$, $\theta$, $\chi$, $\kappa$, and $\eta$. The activated alumina which has deposited thereof 0.1 to 30% by weigh of at least one element selected from the group consisting of rare earth elements such as lanthanum, cerium, and neodymium and alkaline earth elements such as calcium and barium is also usable.

Although the particle size of the active alumina powder is not specifically defined, the powder is desired to have an average particle diameter in the range of 1 to 500 $\mu$m, preferably 50 to 300 $\mu$m. If the average particle diameter exceeds 500 $\mu$m, the precious metal is deposited only on the surface of the particles of the powder and not within the particles. Thus, the deposition of the precious metal in a highly uniformly dispersed state as aimed at by the present invention is obtained only with difficulty.

Examples of the rhodium source usable advantageously in the present invention include rhodium nitrate, rhodium chloride, rhodium sulfate, rhodium sulfite complex salts, and rhodium ammine complex salts. Examples of the platinum source and the palladium source which are usable advantageously in this invention are platinium chloride, dinitro-diammine platinum, platinum sulfite complex salts, platinum tetramine chloride, palladium nitrate, palladium chloride, palladium sulfite complex salts, and palladium tetramine chloride.

Although in the catalyst contemplated by the present invention, the amounts of active alumina, cerium, and precious metal to be carried are not specifically defined, the active alumina is carried in an amount of 20 to 200 g, preferably 40 to 150 g, the alumina-modified cerium oxide in an amount of 10 to 150 g, preferably 30 to 100 g, and platinum and palladium in a combined amount of 0,1 to 5 g, and rhodium in an amount of 0.01 to 1 g, respectively per liter of the catalyst.

For use in the present invention, the carrier is only required to be a refractory material and is not specifically defined in any other respect. The carrier can be effectively used in a granular form or in a monolithic form or in the form of a plate, a bar, or fibers. The catalyst is used particularly advantageously in the form of a monolithic honeycomb. As the monolithic honeycomb carrier, what is generally referred to as a "ceramic honeycomb carrier" can be adopted. Particularly honeycomb carriers made of cordierite, mullite, -alumina, zirconia, titania, titanium phosphate, aluminum titanate, petalite, spodumene, alumino-silicate, and magnesium silicate are desirable. The honeycomb carrier made of cordierite, among others mentioned above, proves particularly advantageous for use in the internal combustion engine. Otherwise, a monolithic carrier made of stainless steel or a Fe-Cr-Al alloy which is resistant to oxidation and to heat can be used. The monolithic carrier can be manufactured by the extrusion molding method or the method which comprises preparing the carrier in the form of a sheet and winding the sheet into a tight roll. The openings for passage of the exhaust gas (in the carrier in the form of a cell) may be in a hexagonal, tetragonal, or trigonal shape or in a corrugated shape. The cell density falling in the range of 150 to 600 cells/square inch suffices for the purpose of use and gives desirable results.

By the statement "the precious metal is deposited fast on the active alumina powder or alumina-modified cerium oxide" is meant the state of a carrier which is produced by impregnating the active alumina or the alumina-modified cerium oxide with a solution of the precious metal, drying the resulting wet composite, and then calcining or reducing the composite, thereby fixing the precious metal on the powder of the active alumina or the alumina-modified cerium oxide, and thereafter mixing the resulting composite mixture with an acidic aqueous solution so that the precious metal will not easily be dissolved out or migrated from the powder.

Further, when at least one precious metal selected from the group consisting of platinum and palladium is deposited on the active alumina or the alumina-modified cerium oxide, especially on the active alumina powder, the precious metal can be deposited in a highly uniformly dispersed state by using the aforementioned solution of precious metal in a form additionally incorporating therein a polybasic carboxylic acid. The catalyst which is manufactured by adopting an improved method of deposition of the precious metal on the powder and additionally using the alumina-modified cerium oxide and manifests the activity of rhodium and that of other precious metal to the fullest possible extent and enjoys a notable improvement in its ability to purify the exhaust gas particularly at low temperatures.

As typical examples of the polybasic carboxylic acid to be used advantageously in this invention, there may be cited aliphatic polybasic carboxylic acids such as oxalic acid, malonic acid, succinic acid, fumaric acid, maleic acid, glutaric acid, adipic acid, malic acid, tartaric acid, and citric acid and aromatic polybasic carboxylic acids such as phthalic acid, trimellitic acid, and pyromellitic acid. Among other polybasic carboxylic acids cited above, oxalic acid and citric acid prove particularly desirable.

The optimum amount of the polybasic carboxylic acid to be added is variable with the kind of the aforementioned powder, particularly the active alumina powder and the kind and the deposited amount of platinum and palladium. When at least one compound selected from among platinic chloride, dinitro-diammine platinum, palladium nitrate, and palladium chloride is used in combination with active alumina powder having a specific surface of 50 to 180 m$^2$/g, it is desirable to add 0.1 to 30 g, of the polybasic carboxylic acid based on 100 g of the active alumina powder.

The standard method for the manufacture of the catalyst of this invention is as follows: The catalyst composite prepared by one of the methods of (1) through (12) mentioned above is dispersed in a prescribed amount of an aqueous medium. The resulting dispersion is applied on the carrier in the monolithic form, for example, to form a coating thereon. Finally, the coated carrier is dried at a temperature in the range of 100° to 200° C., preferably 120° to 130° C., or calcined in the air at a temperature in the range of 300° to 700° C., preferably 400° to 500° C., reduced in a liquid phase with hydrazine, for example, or reduced in a gas phase with H$_2$, for example, to complete a catalyst.

The method for the manufacture of the catalyst of this invention is not limited to the method described above.

Now, the present invention will be described more specifically below with reference to working examples. It should be noted, however, that this invention is not limited to these working examples.

EXAMPLE 1

A catalyst was prepared by using a commercially available monolithic carrier of cordierite (produced by Nippon Gaishi Co., Ltd.). The monolithic carrier possessed of about 300 gas flow cells per square ich in the cross section. It was a cylinder 33 mm in outside diameter and 76 mm in length and about 65 ml in volume.

An aqueous solution obtained by adding 60.5 ml of an aqueous nitric acid solution of dinitro-diammine platinum, $[Pt(NH_3)_2(NO_2)_2]$, (Pt content: 100 g/liter) to 20.0 ml of an aqueous rhodium nitrate solution. $[Rh(NO_3)_3.nH_2O]$, (Rh content: 50 g/liter) and further adding water to a total volume of 320 ml was thoroughly mixed with 350 g of active alumina powder having a surface acrea of 100 m$^2$/g. The resulting mixture was dried at 130° C. for 3 hours and then calcined in the air at 500° C. for one hour to produce alumina powder containing Pt and Rh.

Then, 150 ml of an aqueous solution of 65.3 g of aluminum nitrate, $[Al(NO_3)_3.9H_2O]$, was thoroughly mixed with 319 g of cerium carbonate powder (Ce content: 47% by weight as $CeO_2$). The resulting mixture was dried at 130° C. for five hours and then calcined at 500° C. for one hour to prepare an alumina-modified cerium oxide (Ce/Al=5 in atomic ratio).

An aqueous slurry was prepared with the alumina powder containing Pt and Rh and the alumina-modified cerium oxide obtained as described above. The aforementioned monolithic carrier was immersed in the slurry for one minute, pulled out of the slurry, exposed to a forced current of compressed air to expel excess slurry remaining within cells, then dried at 130° C. for three hours, and calcined at 500° C. for one hour to obtain a perfect catalyst.

This catalyst was found to have 70 g of alumina, 30 g of alumina-modified cerium oxide (Ce/Al=5 in atomic ratio), 1.21 g of Pt, and 0.20 g of Rh deposited thereon per liter of the catalyst.

EXAMPLE 2

An aqueous solution having 14.87 g of hexachloro platinic acid, $[H_2PtCl_6.6H_2O]$, and 1.41 g of rhodium chloride, $[RhCl_3.3H_2O]$, dissolved in a total volume of 225 ml was mixed with 250 g of active alumina powder having a surface area of 100 m$^2$/g. The resulting mixture was dried at 130° C. for three hours and then calcined at 500° C. for one hour to produce an alumina powder containing Pt and Rh.

Then, 250 ml of an aqueous solution of 77.8 g of aluminum nitrate, $[Al(NO_3)_3.9H_2O]$, was mixed with 532 g of cerium carbonate powder (Ce content: 47% by weight as $CeO_2$). The resulting mixture was dried at 130° C. for five hours and then calcined at 500° C. for one hour to produce an alumina-modified cerium oxide (Ce/Al=7 in atomic ratio).

A complete catalyst was obtained by following the procedure of Example 1 using the alumina powder containing Pt and Rh and the alumina-modified cerium oxide obtained as described above.

This catalyst was found to have 50 g of alumina, 50 g of alumina-modified cerium oxide (Ce/Al=7 in atomic ratio), 1.12 g of Pt, and 0.11 g of Rh deposited thereon per liter of the catalyst.

EXAMPLE 3

A mixture consisting of 51.2 ml of an aqueous solution of palladium chloride (Pd content: 100 g/liter), 360 ml of an aqueous solution of 1.33 g of rhodium chloride, $RhCl_3 3H_2O$, and 400 g of active alumina powder having a surface area of 100 m$^2$/g was dried at 130° C. for three hours and calcined at 600° C. for one hour to produce an alumina powder containing Pd and Rh.

Then, 200 ml of an aqueous solution of 43.5 g of aluminum nitrate, $[Al(NO_3)_3.9H_2O]$, was mixed with 426 g of cerium carbonate powder (Ce content: 47% by weight as $CeO_2$). The resulting mixture was dried at 130° C. for five hours and then calcined at 500° C. for one hour to produce an alumina-modified cerium oxide (Ce/Al=10 in atomic ratio).

A complete catalyst was produced by following the procedure of Example 1 using the alumina powder containing Pt and Rh and the alumina-modified cerium oxide obtained as described above.

This catalyst was found to have 100 g of alumina, 50 g of alumina-modified cerium oxide (Ce/Al=10 in atomic ratio), 1.28 g of Pd, and 0.13 g of Rh deposited thereon per liter of the catalyst.

EXAMPLE 4

320 ml of an aqueous solution obtained by diluting 20 ml of a rhodium nitrate aqueous solution (Rh content: 50 g/liter) with pure water was thoroughly mixed with 350 g of active alumina powder having a surface area of 100 m$^2$/g. The resulting mixture was dried at 130° C. for three hours and then calcined in the air at 500° C. for one hours to produce a Rh-containing alumina powder.

The obtained Rh-containing alumina powder was thoroughly mixed with 150 g of alumina-modified cerium oxide (Ce/Al=5 in atomic ratio) obtained in Example 1. The resulting mixed powder was throughly mixed with 500 ml of an aqueous solution obtained by diluting 60.5 ml of an aqueous nitric acid solution of dinitro-diammine platinum (Pt content: 100 g/liter). The resulting mixture was dried at 130° C. for three hours and then calcined at 500° C. for one hour.

An aqueous slurry was prepared using the above powder. The complete catalyst was obtained by following the procedure of Example 1.

This catalyst was found to have 70 g of alumina, 30 g of alumina-modified cerium oxide (Ce/Al=5 in atomic ratio), 1.21 g of Pt and 0.20 g of Rh depositd thereon per liter of the catalyst.

EXAMPLE 5

A catalyst having 71 g of alumina, 31 g of alumina-modified cerium oxide (Ce/Al=5 in atomic ratio), 1.20 g of Pt, and 0.20 g of Rh deposited thereon per liter of the catalyst was produced by following the procedure of Example 1, except that cerium hydroxide powder (Ce content: 72% by weight as $CeO_2$) was used in the place of cerium carbonate.

EXAMPLE 6

A catalyst having 70 g of alumina, 30 g of alumina-modified cerium oxide (Ce/Al=5 in atomic ratio), 1.21 g of Pt, and 0.20 g of Rh deposited thereon per liter of the catalyst was obtained by following the procedure of Example 1, except that alumina sol (containing 10% by weight of alumina) was used in place of aqueous aluminum nitrate solution.

CONTROL 1

A complete catalyst was obtained by following the procedure of Example 1, except that cerium oxide powder obtained by calcining cerium carbonate at 500° C. for one hour was used in the place of the alumina-modified cerium oxide.

This catalyst was found to have 70 g of alumina, 30 g of cerium oxide, 1.21 g of Pt, and 0.20 g of Rh deposited thereon per liter of the catalyst.

CONTROL 2

A catalyst was produced by using the same commercially available cordierite carrier as in Example 1.

Separately, 700 ml of an aqueous solution of 378 g of cerous nitrate, $[Ce(NO_3)_3 \cdot 6H_2O^2]$, was thoroughly mixed with 350 g of active alumina having a surface area of 100 m$^2$/g. The resulting mixture was dried at 130° C. for five hours and then calcined at 600° C. for two hours.

Subsequently, 400 g of the cerium-containing alumina obtained as described above was thoroughly mixed with an aqueous solution obtained by adding 48.4 ml of an aqueous nitric acid solution of dinitro-diammine platinum, $[Pt(NH_3)_2(NO_2)_2]$, (Pt content: 100 g/liter) to 16.0 ml of an aqueous rhodium nitrate solution, $[Rh(NO_3)_3 \cdot nH_2O]$, (Rh content: 50 g/liter) and adding water to a total volume of 360 ml. The resulting mixture was dried at 130° C. for three hous and then calcined at 500° C. for one hour to produce a catalyst component-containing alumina.

A complete catalyst was obtained by following the procedure of Example 1 using the above catalyst component-containing alumina.

This catalyst was found to have 70 g of alumina, 30 g of CeO$_2$, 1.21 g of Pt, and 0.20 g of Rh deposited thereon per liter of the catalyst.

TEST 1

The catalysts obtained in Examples 1 through 6 and those obtained in Controls 1 and 2 were subjected to a durability running test as described below and then tested for three way reaction activity.

A commercially available gasoline engine (electronic fuel injection type (8-cylinder, 4,400 cc) was operated in a fixed mode of alternating 60 seconds of steady-statge running (3,000 rpm) and 7 seconds of low-speed running (minimum of 1,800 rpm; when reducing the speed, the fuel was cut and the catalyst was exposed to a atmosphere of large excess of oxygen), under the conditions of 800° C. of inlet gas temperature and 350,000 hr$^{-1}$ of space velocity (SV). During this operation, the catalyst each filled in the multi-cell converter were aged for 50 hours.

The test for three way reaction activity was carried out by operating a commercially available electronically controlled engine (4-cylinder, 1,800 cc) under the conditions of 400° C. of inlet gas temperature and 90,000 hr$^{-1}$ space velocity, with a given catalyst placed in the multiconverter connected to the exhaust system of the engine. During the operation of this engine, signals of 1-Hz sine waves generated by an external oscillator were introduced into the control unit of the engine to fluctuate the air-fuel ratio (A/F) within ±0.5 A/F at 1 Hz and measure the conversion efficiencies of CO, HC, and NOx at a fixed point of measurement, with the A/F ratio varied between 14.1 and 15.1 as graduated with intervals of 0.1 A/F.

The numerical conversion values obtained by the measurement described above were plotted in a graph, with the A/F ratio graduated along the horizontal axis and the ratio of removal along the vertical axis, to form three way characteristic curves. The preformance of a given catalyst was evaluated by finding the range of A/F ratios in which the conversion efficiencies of both CO and NO exceed 80% (the range hereinafter referred to as "80% window"), the conversion efficiencies of CO and NO at the point of crossing between the conversion efficiency curve of CO and that of NO (hereinafter referred to as "cross-over point"), and the conversion efficiency of HC corresponding to the A/F ratio at that cross-over point.

The results of the evaluation are shown in Table 1.

TABLE 1

| | Results of evaluation* | | |
|---|---|---|---|
| | | Cross-over point | |
| Run No. | 80% Window width | A/F | CO—NO conversion efficiency (%) | HC conversion efficiency (%) |
| Example 1 | 0.19 | 14.57 | 93.6 | 94.1 |
| Example 2 | 0.17 | 14.56 | 92.3 | 93.6 |
| Example 3 | 0.17 | 14.57 | 91.8 | 93.3 |
| Example 4 | 0.15 | 14.56 | 90.1 | 93.1 |
| Example 5 | 0.16 | 14.58 | 91.3 | 93.1 |
| Example 6 | 0.18 | 14.56 | 92.9 | 93.5 |
| Control 1 | none | 14.56 | 79.6 | 92.0 |
| Control 2 | none | 14.57 | 76.3 | 91.0 |

*Aging condition: Inlet gas temperature 800° C. 50 hrs
Precious metal loading: 1.41 g/liter It is noted from Table 1 that the catalysts of Examples 1–6 which used the alumina-modified cerium oxide of the present invention exhibited far better three way reaction activity than the catalysts of Control 1 and Control 2 which used ordinary cerium oxide.

Then, the catalyst of Example 1 and Control 1 which had undergone the aging in the engine were tested for improvement in the effect of promoting the water gas shift reaction and the effect of oxygen strage to be manifested by the alumina-modified cerium oxide as follows: In a flow type reactor, a reaction gas consisting of 0.5% of CO, 10% of H$_2$O, 14% of C$_2$, and the balance of N$_2$ was introduced to the catalyst to test for CO conversion in the water gas shift reaction. The test was carried out under the conditions of 400° C. of reaction temperature and 90,000 hr$^{-1}$ of space velocity. The results of the test are shown in Table 2.

TABLE 2

| Results of water gas shift reaction | |
|---|---|
| Catalyst | CO conversion (%) |
| Example 1 | 27 |
| Control 1 | 10 |

It is noted from Table 2 that the catalyst of Example 1 which used the alumina-modified cerium oxide showed a higher CO conversion than the catalyst of Control 1 which used the ordinary cerium oxide, i.e. that the aluminamodified cerium oxide was highly effective in enhancing the water gas shift reaction.

Then, in the same flow type reactor, a model gas of oxidizing atmosphere was kept flowing and a fixed amount of CO pulses was introduced three times at an interval of one minute. Each amount of converted CO pulses by the catalyst was measured, and then the obtained conversion efficiencies of each CO pulse were averaged. This test was carried out under the conditions of 400° C. of reaction temperature and 90,000 hr$^{-1}$ of space velocity. The results of the test were as shown in Table 4.

TABLE 3

Model gas composition

| CO | 0.4% | HC | 1,200 ppm |
|---|---|---|---|
| NO | 500 ppm | $CO_2$ | 14% |
| $H_2$ | 0.13% | $O_2$ | 0.6% |
| $H_2O$ | 105 | $N_2$ | Balance |

TABLE 4

Results of CO pulse oxidation test

| Catalyst | Conversion of CO pulse (%) |
|---|---|
| Example 1 | 42 |
| Control 1 | 25 |

It is noted from Table 4 that the catalyst of Example 1, even when it was exposed to the reducing atmosphere suddenly with the CO pulses, efficiently oxidized and removed the CO pulses owing to the outstanding oxygen storage ability of the alumina-modified cerium oxide.

EXAMPLE 7

An aqueous solution obtained by diluting 31.8 ml of an aqueous nitric acid solution of dinitro-diammine platinum, $Pt(NH_3)_2(NO_2)_2$, (Pt content: 100 g/liter) with 210 ml of pure water was thoroughly mixed with 300 g of active alumina powder having a surface area of 100 m$^2$/g. The resulting mixture was dried at 130° C. for three hours and then calcined in the air at 500° C. for one hours to produce a Pt-containing alumina powder.

Then, 150 ml of an aqueous solution of 65.3 g of aluminum nitrate, $[Al(NO_3)_3.9H_2O]$, was thoroughly mixed with 319 g of cerium carbonate powder (Ce content: 47% by weight as $CeO_2$). The resulting mixture was dried at 130° C. for five hours and then calcined at 500° C. for one hour to produce an alumina-modified cerium oxide. Then, 150 g of the aluminamodified cerium oxide was thoroughly mixed with 10.8 ml of an aqueous rhodium nitrate solution. $[Rh(NO_3)_3.nH_2O]$, (Rh content: 50 g/liter) and 120 ml of water. The resulting mixture was dried at 130° C. for three hours and then calcined at 500° C. for one hour to produce a Rh-containing alumina-modified cerium oxide (Ce/Al=5 in atomic ration).

An aqueous slurry was prepared with the Pt-containing alumina powder and the Rh-containing alumina-modified cerium oxide obtained as described above. The same monolithic carrier as in example 1 was immersed in the slurry for one minute, pulled out of the slurry, and exposed to a forced current of compressed air to expel excess slurry remaining within cells, then dried at 130° C. for three hours, and calcined at 500° C. for one hour to produce a complete catalyst.

This is catalyst was found to have 100 g of alumina, 50 g of alumina-modified cerium oxide (Ce/Al=5 in atomic ratio), 1.06 g of Pt, and 0.18 g of Rh deposited thereon per liter of the catalyst.

EXAMPLE 8

A mixture consisting of 160 ml of an aqueous solution of 11.26 g of hexachloro platinic acid, $[H_2PtCl_6 6H_2O]$, was mixed with 200 g of active alumina powder having a surface area of 100 m$^2$/g. The resulting mixture was dried at 130° C. for three hours and then calcined at 500° C. for one hour to produce a Pt-containing alumina powder.

Then, 220 ml of an aqueous solution of 54.4 g of aluminum nitrate, $[Al(NO_3)_3.9H_2O]$, was mixed with 426 g of cerium carbonate powder (Ce content: 47% by weight as CeO). The resulting mixture was dried at 130° C. for five hours and then calcined at 500° C. for one hour to produce an alumina-modified cerium oxide. Then a mixture of 200 g of the alumina-modified cerium oxide with 160 ml of an aqueous solution of 1.84 g of rhodium chloride $[RhCl_3.3H_2O]$, was dried at 130° C. for three hours and then calcined at 500° C. for one hour to produce a Rh-containing alumina-modified cerium oxide (Ce/Al=8 in atomic ratio).

A complete catalyst was produced by following the procedure of Example 7 using the Pt-containing alumina powder and the Rh-containing alumina-modified cerium oxide obtained as described above.

This catalyst was found to have 50 g of alumina, 50 g of alumina-modified cerium oxide (Ce/Al=8 in atomic ratio), 1.06 g of Pt, and 0.18 g of Rh deposited thereon per liter of the catalyst.

EXAMPLE 9

A mixture consisting of 260 ml of an aqueous solution of 8.50 g of palladium chloride, $[PdCl_2.2H_2O]$, and 320 g of active alumina powder having a surface area of 100 m$^2$/g was dried at 130° C. for three hours and then calcined at 600° C. for one hour to produce a Pd-containing alumina powder.

Then, 94.7 g of alumina sol (containing 10% by weight of alumina) was mixed with 340 g of cerium carbonate (Ce content: 47% by weight as $CeO_2$) and 100 g of water. The resulting mixture was dried at 130° C. for five hours and then calcined at 500° C. for one hour to produce an aluminamodified cerium oxide. Then 160 g of the alumina-modified cerium oxide was mixed with 130 ml of an aqueous solutin of 1.84 g of rhodium chloride $[RhCl_3.3H_2O]$. The resulting mixture was dried at 130° C. for three hours and then calcined at 500° C. for one hour to produce a Rh-containing alumina-modified cerium oxide (Ce/Al=5/1 in atomic ratio).

A complete catalyst was produced by following the procedure of Example 7 using the Pd-containing alumina powder and the Rh-containing alumina-modified cerium oxide obtained as described above.

This catalyst was found to have 80 g of alumina, 40 g of alumina-modified cerium oxide (Ce/Al=5 in atomic ratio), 1.06 g of Pd, and 0.18 g of Rh deposited thereon per liter of the catalyst.

CONTROL 3

An aqueous solutin produced by diluting 31.8 ml of an aqueous nitric acid solution of dinitro-diammine platinum (Pt content: 100 g/liter) and 10.8 ml of an aqueous rhodium nitrate solution (Rh content: 50 g/liter) with 200 ml of pure water was thoroughly mixed with 300 g of active alumina powder having a surface area of 100 m$^2$/g. The resulting mixture was dried at 130° C. for three hours and then calcined in the air at 500° C. for one hour to produce a Pt-and Rh-containing alumina powder.

An aqueous slurry was prepared with the Pt-and Rh-containing alumina powder obtained as described above and 150 g of the same alumina-modified cerium oxide as used in Example 7. A complete catalyst was then produced by following the procedure of Example 7. This catalyst was found to have 100 g of alumina, 50 g of alumina-modified cerium oxide (Ce/Al=5 in atomic ratio), 1.06 g of Pt, and 0.18 g of Rh deposited thereon per liter of the catalyst.

EXAMPLE 10

150 g of alumina-modified cerium oxide (Ce/Al in atomic ratio) obtained in Example 7 was thoroughly mixed with 160 ml of an aqueous solution obtained by diluting 10.8 ml of an aqueous solution of rhodium nitrate (Rh content: 50 g/liter) with pure water, dried at 130° C. for 30 minutes and then calcined at 500° C. for one hour to produce a Rh-containing alumina-modified cerium oxide.

The obtained Rh-containing alumina-modified crium oxide was throughly mixed with 300 g of active alumina having specific surface area of 100 m²/g. The resulting mixed powder was throughly mixed with 450 ml of an aqueous solution obtained by diluting 31.8 ml of an aqueous nitric acid solution of dinitro-diammine platinum (Pt content: 100 g/liter). The resulting mixture was dried at 130° C. for three hours and then calcine at 500° C. for one hour.

An aqueous slurry was prepared using the above powder. Then complete catalyst was obtained by following the procedure of Example 7.

This catalyst was found to have 100 g of alumina, 50 g of alumina-modified cerium oxide (Ce/Al=5 in atomic ratio), 1.06 g of Pt and 0.18 g of Rh deposited thereon per liter of the catalyst.

CONTROL 4

A mixture consisting of 350 g of an aqueous solution of 53 g of cerous nitrate, [Ce(NO$_3$)$_3$.6H$_2$O], and 420 g of active aluminum having a surface area of 100 m²/g was dried at 130° C. for five hours and then calcined at 600° C. for two hours. An aqueous slurry was prepared with the cerium-containing alumina powder obtained as described above. A cerium-containing alumina coating was formed on a cordierite carrier by following the procedure of Example 7. Subsequently, the coated carrier was impregnated with an aqueous nitric acid solution of dinitro-diammine platinum. The impregnated coated carrier was dried at 120° C. for two hours and then calcined at 500° C. for 30 minutes. The calcined composite was impregnated with an aqueous rhodium chloride solution, dried at 120° C. for two hours, and then calcined at 500° C. for 30 minutes to produce a complete catalyst.

This catalyst was found to have 140 g of alumina, 7 g of cerium oxide, 1.06 g of Pt, and 0.18 g of Rh deposited thereon per liter of the catalyst.

CONTROL 5

A complete catalyst was produced by following the procedure of Example 7, except that cerium oxide powder obtained by calcining cerium carbonate at 500° C. for one hour was used in place of the alumina-modified cerium oxide.

This catalyst was found to have 100 g of alumina, 50 g of cerium oxide, 1.06 g of Pt, and 0.18 g of Rh deposited thereon per liter of the catalyst.

TEST 2

The catalysts of Examples 7-10 and the catalysts of controls 3-5 were subjected to a durability running test as follows and then tested for three way reaction activity. The same engine as in Test 1 (8-cylinder 4,400 cc) was operated in the same mode, with the catalysts each filled multi-cell-converter and left aging at an inlet gas temperature of 800° C. for 100 hours. The evaluation of three way reaction activity was carried out by operating the same engine as in test 1 (4-cylinder 1,800 cc) under the same conditions. The results of the evaluation were as shown in Table 5.

TABLE 5

| | | Results of evaluation* | | |
| | | | Cross-over point | |
| Run No. | 80% Window width | A/F | CO—NO conversion efficiency (%) | HC conversion efficiency (%) |
| --- | --- | --- | --- | --- |
| Example 7 | 0.15 | 14.56 | 90 | 94 |
| Example 8 | 0.12 | 14.56 | 88 | 93 |
| Example 9 | 0.10 | 14.55 | 87 | 92 |
| Example 10 | 0.11 | 14.55 | 87 | 92 |
| Control 3 | 0.03 | 14.55 | 81 | 88 |
| Control 4 | none | 14.54 | 70 | 80 |
| Control 5 | none | 14.54 | 75 | 83 |

*Aging condition: Inlet gas temperature 800° C., 100 hrs.
Precious metal loading: 1.24 g/liter It is noted from Table 5 that the catalysts of Examples 7-10 which had rhodium dispersed and deposited on the alumina-modified cerium oxide of this invention showed outstanding three way reaction activity. Particularly, comparison between Example 7 and control 3 clearly shows that the deposition of rhodim on the alumina-modified cerium oxide resulted in improvement of activity. Further, comparison between Example 7 and control 5 reveals that the catalysts using the alumina-modified cerium oxide excelled the catalysts using ordinary cerium oxide.

EXAMPLE 11

An aqueous solution obtained by diluting 5 ml of an aqueous rhodium nitrate solution (Rh content: 50 g/liter) with 150 ml of pure water was thoroughly mixed with 150 g of active alumina powder having an average particle diameter of about 100 μm. The resulting mixture was dried at 130° C. for three hours and then calcined in the air at 400° C. for two hours. The power consequently obtained was milled in a mortar to produce a Rh-containing alumina powder having an average particle diameter of about 100 m.

Then, in an aqueous solution obtained by dissolving 6 g of oxalic acid,[C$_2$H$_2$O$_4$.2H$_2$O], in 150 ml of pure water, 12.5 ml of an aqueous nitric acid solution of dinitrodiammine platinum (Pt content: 100 g/liter) was thoroughly stirred. The resulting aqueous solution was thoroughly mixed with the Rh-containing alumina powder mentioned above. The mixture consequently obtained was dried at 130° C. for three hours and then calcined in the air at 400° C. for two hours to produce a Rh-and Pt containing alumina powder.

In a ball mill, 75 g of the same alumina modified cerium oxide as used in Example 1 and the Rh- and Pt-containing alumina powder mentioned above were milled in the presence of a water for 20 hours to produce a slurry for coating. The aforementioned monolithic carrier as used in Example 1 was immersed in the coating slurry for one minute, removed from the slurry, and exposed to a forced current of compressed air to expel excess slurry remaining within cells. The coated carrier was dried at 130° C. for three hours and then calcined in the air at 400° C. for one hour to produce a complete catalyst.

This catalyst was found to have 100 g of alumina, 50 g of alumina-modified cerium oxide (Ce/Al=5 in atomic ratio), 0.83 g of Pt, and 0.17 g of Rh deposited thereon per liter of the catalyst.

EXAMPLE 12

The same monolithic carrier as mentioned above was coated by following the procedure of Example 11 using a coating slurry prepared by repeating the procedure of Example 11. The resulting coated carrier was dried at 130° C. for three hours to complete a catalyst. This catalyst was found to have 100 g of alumina, 50 g of alumina-modified cerium oxide, 0.83 g of Pt, and 0.17 g of Rh deposited thereon per liter of the catalyst.

EXAMPLE 13

A metal monolithic carrier, cylinder 33 mm in outside diameter and 76 mm in length, was formed by laminating a thin metal foil composed of aluminum containing stainless steel and a corrugated sheet thereof (pitch 2.5 mm) by turns.

The carrier had about 475 gas flow cells per square inch in the cross section.

A powder was prepared by following the procedure of Example 11 and the wet-milled in a a ball mill for 25 hours to form an aqueous coating slurry having 1.0 m of average particle diameter. The above metal monolithic carrier was coated with said coating slurry according to the procedure of Example 11, dried at 130° C. for three hours and calcined in the air at 400° C. for two horus to produce a complete catalyst.

This catalyst was found to have 100 g of alumina, 50 g of alumina-modified cerium oxide, 0.83 g of Pt and 0.17 g of Rh deposited thereon per liter of the catalyst.

EXAMPLE 14

A complete catalyst was obtained by following the procedure of Example 11, except that a Rh-and Pt-containing alumina powder obtained by first impregnating active alumina powder with an aqueous solution resulting from the mixture of an aqueous nitric acid solution of dinitrodiammine platinum with an aqueous oxalic acid solution thereby effecting deposition of Pt and subsequently impregnating the Pt-containing alumina powder with an aqueous rhodium nitrate solution thereby effecting deposition of Rh was used instead.

This catalyst was found to have 100 g of alumina, 50 g of alumina-modified cerium oxide, 0.83 g of Pt, and 0.17 g of Rh deposited thereon per liter of the catalyst.

EXAMPLE 15

A complete catalyst was obtained by following the procedure of Example 11, except that 10 g of citric acid, [$C_6H_8O_7$], was used in the place of oxalic acid.

This catalyst was found to have 100 g of alumina, 50 g of alumina-modified cerium oxide, 0.83 g of Pt, and 0.17 g of Rh deposited thereon per liter of the catalyst.

EXAMPLE 16

A complete catalyst was obtained by following the procedure of Example 14, except that 10 g of citric acid was used in the place of oxalic acid.

This catalyst was found to have 100 g of alumina, 50 g of alumina-modified cerium oxide, 0.83 g of Pt, and 0.17 g of Rh deposited thereon per liter of the catalyst.

EXAMPLE 17

A complete catalyst was obtained by following the procedure of Example 11, except that 5 ml of an aqueous rhodium chloride solution (Rh content: 50 g/liter) was used in the place of the aqueous rhodium nitrate solution.

This catalyst was found to have 100 g of alumina, 50 g of alumin-modified cerium oxide, 0.83 g of Pt, and 0.17 g of Rh deposited thereon per liter of the catalyst.

EXAMPLE 18

An aqueous solution was obtained by thoroughly stirring 12.5 ml of an aqueous platinic chloride solution (Pt content: 100 g/liter) in aqueous solution having 3 g of oxalic acid dissolved in 150 ml of pure water. The aqueous solution was thoroughly mixed with 150 g of Rh-containing alumina powder obtained in the same manner as in Example 11 for 30 minutes. The resulting mixture was dried at 130° C. for three hours and then calcined in the air at 400° C. for two hours to produce a Rh-and Pt-containing alumina powder.

A complete catalyst was obtained by following the procedure of Example 11 using the Rh-and Pt-containing alumina powder and 75 g of the same alumina-modified cerium oxide as used in Example 1.

This catalyst was found to have 100 g of alumina, 50 g of alumina-modified cerium oxide, 0.83 g of Pd, and 0.17 g of Rh deposited thereon per liter of the catalyst.

EXAMPLE 19

An aqueous solution was obtained by thoroughly stirring 12.5 ml of an aqueous palladium chloride solution (Pd content: 100 g/liter) in an aqueous solution having 3 g of oxalic acid dissolved in 150 ml of pure water. The aqueous solution was thoroughly mixed with 150 g of Rh-containing alumina powder obtained in the same manner as in Example 11 for 30 minutes. The resulting mixture was dried at 130° C. for three hours and then calcined in the air at 400° C. for two hours to produce a Rh-and Pd-containing alumina powder.

A complete catalyst was obtained by following the procedure of Example 11 using the Rh-and Pd-containing alumina powder and 75 g of the same alumina-modified cerium oxide as used in Example 1.

This catalyst was found to have 100 g of alumina, 50 g of alumina-modified cerium oxide, 0.83 g of Pd, and 0.17 g of Rh deposited thereon per liter of the catalyst.

EXAMPLE 20

A complete catalyst was obtained by following the procedure of Example 18, except that 12.5 ml of an aqueous palladium chloride solution (Pd content: 100 g/liter) was used in the place of the aqueous palladium nitrate solution.

This catalyst was found to have 100 g of alumina, 50 g of alumina-modified cerium oxide, 0.83 g of Pd, and 0.17 g of Rh deposited thereon per liter of the catalyst.

EXAMPLE 21

An aqueous solution was prepared by thoroughly stirring 8.9 ml of an aqueous nitric acid solution of dinitro-diammine platinum (Pt content: 100 g/liter) and 3.6ml of an aqueous palladium nitrate solution (pd content: 100 g/liter) in an aqueous solution having 6 g of oxalic acid dissolved in 150 ml of pure water. This aqueous solutin was thoroughly mixed for 30 minutes with 150 g of Rh-containing alumina powder obtained in the same manner as in Example 11. The resulting mixture was dried at 130° C. for three hours and then calcined in the air at 400° C. for two hours to produce a Rh-, Pt-, and Pd-containing alumina powder.

A complete catalyst was obtained by following the procedure of Example 11 using the Rh-, Pt-, and Pd-containing alumina powder and 75 g of the same alumina-modified cerium oxide as used in Example 1.

This catalyst was found to have 100 g of alumina, 50 g of alumina-modified cerium oxide, 0.59 g of Pt, 0.24 g of Pd, and 0.17 g of Rh deposited thereon per liter of the catalyst.

CONTROL 6

In 150 ml of pure water, 5 ml of an aqueous rhodium nitrate solution (Rh content: 50 g/liter) and 12.5 ml of an aqueous nitric acid solution of dinitro-diammine platinum (Pt content: 100 g/liter) were thoroughly stirred to produce an aqueous solution. This aqueous solution was thoroughly mixed for 30 minutes with 150 g of the same active alumina powder as used in Example 11. The resulting mixture was dried at 130° C. for three hours and then calcined in the air at 400° C. for two hours to produce a Rh- and Pt-containing alumina powder.

A complete catalyst was obtained by following the procedure of Example 11 using the Rh- and Pt-containing alumina powder and 75 g of the same alumina-modified cerium oxide as used in Example 1.

This catalyst was found to have 100 g of alumina, 50 g of alumina-modified cerium oxide, 0.83 g of Pt, and 0.17 g of Rh deposited thereon per litr of the catalyst.

CONTROL 7

A complete catalyst was obtained by following the procedure of Control 1, except that 12.5 ml of an aqueous hexachloro platinic acid solution (Pt content: 100 g/liter) was used in the place of the aqueous nitric acid solution of dinitro-diammine platinum.

This catalyst was found to have 100 g of alumina, 50 g of alumina-modified cerium oxide, 0.83 g of Pt, and 0.17 g of Rh deposited thereon per liter of the catalyst.

CONTROL 8

A complete catalyst was obtained by following the procedure of Control 6, except that 12.5 ml of an aqueous palladium nitrate solution (Pd content: 100 g/liter) was used in the place of the aqueous nitric acid solution of dinitro-diammine platinum.

This catalyst was found to have 100 g of alumina, 50 g of alumin-modified cerium oxide, 0.83 g of Pd, and 0.17 g of Rh deposited thereon per liter of the catalyt.

CONTROL 9

A complete catalyst was obtained by following the procedure of Control 6, except that 12.5 ml of an aqueous palladium chloride solution (Pd content: 100 g/liter) was used in the place of the aqueous nitric acid solution of dinitro-diammine platinum.

This catalyst was found to have 100 g of alumina, 50 g of alumina-modified cerium oxide, 0.83 g of Pd, and 0.17 g of Rh deposited thereon per liter of the catalyst.

CONTROL 10

A complete catalyst was obtained by following the procedure of control 6, except that 8.9 ml of an aqueous nmitric acid solution of dinitro-diammine platinum (Pt content: 100 g/liter) and 3.6 ml of an aqueous palladium nitrate solution (Pd content: 100 g/liter) were used in the place of 12.5 ml of the aqueous nitric acid soltuion of dinitro-diammine platinum.

This catalyst was found to have 100 g of alumina, 50 g of alumina-modified cerium oxide, 0.50 g of Pt, 0.24 g of Pd, and 0.17 g of Rh deposited thereon per liter of the catalyst.

For the purpose of demonstrating that the method of precious metal deposition contemplated by the present invention improves the dispersibility of Rh and Pt, alumina powders carrying precious metals thereon were prepared as indicated in the following working examples.

EXAMPLE 22

An aqueous solution having 6 g of oxalic acid dissolved in 150 ml of pure water was thoroughly mixed 12.5 ml of an aqueous nitric acid solution of dinitro-diammine platinum (Pt content: 100 g/liter) was throughly stirred. The resulting aqueous solution was thoroughly mixed with 150 g of the same active alumina powder as used in Example 11. The resulting mixture was dried at 130° C. for three hours and then calcined in the air at 400° C. for two hours to produce a Pt-containing alumina powder (Powder A-1).

EXAMPLE 23

A Rh- and Pt-containing alumina powder (Powder B-1) having Rh deposited first thereon and Pt further deposited subsequently thereon was prepared by following the procedure of Example 11 using 5 ml of an aqueous rhodium nitrate solution (Rh content: 50 g/liter), 6 g of oxalic acid, and 12.5 ml of an aqueous nitric acid solution of dinitrodiammine platinum (Pt content: 100 g/liter).

CONTROL 11

A Pt-containing alumina powder (Powder A-2) was prepared by following the procedure of Example 22, except that the use of oxalic acid was omitted.

CONTROL 12

A Rh- and Pt-containing alumina powder (Powder B-2) having Rh and Pt simultaneously deposited on active alumina (Powder B-2) was prepared by following the procedure of Control 6.

TEST 3

The catalysts of Examples 11–21 and the catalysts of Controls 6–10 were tested for catalytic activity after they had undergone durability running. The same engine (8-cylinder 4,400 cc) as used in Test 1 was operated in the same mode, with the catalysts each filled in the multi-cellconverter and left aging under the conditions of 800° C. of inlet gas temperature far 100 hours. The evaluation of three way reaction activity was carried out with entirely the same engine (1-cylinder 1,800 cc) as in Test 1 under the same conditions.

The ability of the catalyst to purify the exhaust gas at low temperatures was evaluated under the same engine. operation conditions as those used for the evaluation of three way reaction activity by fixing the average air/fuel ratio at 14.6. The catalyst inlet gas temperature was continuously changed from 200° to 450° C. by a heat exchanger fixed in front of the catalyst converter, analyzing the catalyst inlet gas composition and the outlet gas composition during the course of the variation of temperature, and calculating the conversion efficiencies of CO, HC, and NOx.

The three way reaction activity of a given catalyst was evaluated by plotting the conversion efficiencies of CO, HC and NOx vs. the inlet air/fuel ratios on a graph, and finding the conversion efficiencies at the cross-over point and the conversion efficiency of HC corresponding to the air/fuel ratio at the cross-over point.

The ability of a given catalyst to purify the exhaust gas at low temperatures was evaluated by plotting the of CO, HC, and NOx vs, inlet gas temperatures obtained by the aforementioned method on a graph and finding the inlet gas temperature ($T_{50}$) at which the conversion efficiency was reached to be 50%. The results were as shown in Table 6.

sion of both Pt and Rh. Owing to the improved dispersion of such precious metals, the catalyst of the present invention is believed to exhibit outstanding durability and an outstanding ability to purify the exhaust gas at low temperatures.

As described above, the catalyst of this invention for purifying the exhaust gas is enabled to exhibit outstanding durability and an outstanding ability to purify the exhaust gas at low temperatures because of the use of active alumina powder which has Pt and/or Pd and Rh deposited as highly uniformly dispersed. It manifests an outstanding effect in purifying the exhaust gas emitted from the fuel-saving vehicles and smaller vehicles which are tending toward lower exhaust gas temperatures as well as from the conventional automobiles.

TABLE 6

Results of rating*

| Catalyst | Three way reaction activity Cross-over point | | Purification performance at low temperature | | |
|---|---|---|---|---|---|
| | CO—NO conversion efficiency (%) | HC conversion efficiency (%) | Purification of CO $T_{50}$ (°C.) | Purification of HC $T_{50}$ (°C.) | Purification of NO $T_{50}$ (°C.) |
| Example 11 | 88 | 93 | 310 | 319 | 307 |
| Example 12 | 87 | 93 | 306 | 315 | 303 |
| Example 13 | 87 | 93 | 309 | 318 | 306 |
| Example 14 | 86 | 93 | 311 | 321 | 306 |
| Example 15 | 86 | 93 | 310 | 318 | 306 |
| Example 16 | 87 | 92 | 312 | 320 | 307 |
| Example 17 | 86 | 92 | 315 | 324 | 310 |
| Example 18 | 85 | 90 | 322 | 330 | 317 |
| Example 19 | 85 | 90 | 322 | 332 | 318 |
| Example 20 | 85 | 89 | 325 | 335 | 319 |
| Example 21 | 87 | 92 | 318 | 326 | 312 |
| Control 6 | 83 | 90 | 350 | 360 | 345 |
| Control 7 | 80 | 89 | 361 | 370 | 355 |
| Control 8 | 79 | 88 | 355 | 367 | 349 |
| Control 9 | 78 | 88 | 362 | 374 | 355 |
| Control 10 | 80 | 89 | 356 | 368 | 350 |

*Aging condition: Inlet gas temperature 800° C., 100 hrs.
Precious metal loading: 1.0 g/l It is noted from Table 6 that the catalysts of Examples 11-21 prepared by the method of precious metal deposition contemplated by this invention exhibited higher three way reaction activity than the catalysts of Controls 6-10 and extremely excelled in ability to remove CO, HC, and NOx from the exhaust gas at low temperatures.

TEST 4

The powders A-1, A-2, B-1, and B-2 prepared in Examples 22-23 and Controls 11-12 were tested for dispersion of precious metals by the CO adsorption method. The results were as shown in Table 7.

TABLE 7

| | Dispersion of precious metals | | |
|---|---|---|---|
| | Powder | Precious metal | Co adorped mole/g powder ($\times 10^{-5}$ mole) |
| Example 22 | A-1 | Pt | 3.4 |
| Control 11 | A-2 | Pt | 2.5 |
| Example 23 | B-1 | Pt, Rh | 6.3 |
| Control 12 | B-2 | Pt, Rh | 5.0 |

It is noted from Table 7 that in the powder A-1 of Example 22, the dispersion of Pt was far better than in the powder A-2 of Control 11 which used no oxalic acid and that in the powder B-1 of Example 23 corresponding to Example 11 of the present invention, the dispersion Pt and Rh was much better than in the powder B-2 of Control 12 corresponding to Control 6. These results indicate that the method of precious metal deposition disclosed by the present invention enhances the disper-

What is claimed is:

1. A catalyst for plurifying exhaust gas, having deposited on a monolithic honeycomb carrier a catalyst composition comprising an alumina-modified cerium oxide obtained by impregnating a water-insoluble cerium compound with an aqueous solution of at least one member selected from the group consisting of water-soluble aluminum compounds and alumina hydrates and calcining the product of impregnation, at least one precious metal selected from the group consisting of platinum, palladium, and rhodium, and active alumina.

2. A catalyst according to claim 1, wherein said precious metal is dispersed and deposited in advance on the powder of at least one member selected from the group consisting of active alumina and an alumina-modified cerium oxide.

3. A catalyst according to claim 2, wherein said precious metal is dispersed and deposited in advance on active alumina.

4. A catalyst according to claim 2, wherein said precious metal is dispersed and deposited in advance on an alumina-modified cerium oxide.

5. A catalyst according to claim 2, wherein said precious metal is dispersed and deposited in advance on said alumina-modified cerium oxide and said active alumina.

6. A catalyst according to claim 1, wherein the atomic cerium to aluminum, Ce/Al, in ratio of said alumina-modified cerium oxide is in the range of from 1 to 20.

7. A catalyst according to claim 1, wherein said water-insoluble cerium compound is selected from the group consisting of cerium carbonate, cerium oxide, and cerium hydroxide.

8. A catalyst according to claim 1, wherein said cerium compound is cerium carbonate.

9. A catalyst according to claim 1, wherein said water-soluble aluminum compound is selected from the group consisting of aluminum nitrate, aluminum chloride, and aluminum sulfate.

10. A catalyst according to claim 1, wherein said water-soluble aluminum compound is aluminum nitrate.

11. A catalyst according to claim 1, wherein said active alumina has a specific surface in the range of 50 to 180 m$^2$/g.

12. A catalyst according to claim 1, which has 20 to 200 g of active alumina, 10 to 150 g of alumina-modified cerium oxide, a total of 0.1 to 5 g of platinum and palladium, and 0.01 to 1 g of rhodium deposited thereon per liter of the catalyst.

13. A catalyst according to claim 3, wherein said rhodium is dispersed and deposited in advance on said active alumina.

14. A catalyst according to claim 13, wherein said rhodium is dispersed and deposited in advance on said active alumina and at least one precious metal selected from the group consisting of platinum and palladium is subsequently dispersed and deposited on the rhodium-containing active alumina.

15. A catalyst according to claim 3, wherein at least one precious metal selected from the group consisting of platinum and palladium is dispersed and deposited in advance.

16. A catalyst according to claim 15, wherein at least one precious metal selected from the group consisting of platinum and palladium is dispersed and deposited in advance on said active alumina and rhodium is subsequently dispersed and deposited on said precious metal-containing active alumina.

17. A catalyst according to claim 3, wherein platinum, palladium, and rhodium are dispersed and deposited on said active alumina in advance.

18. A catalyst according to claim 4, wherein rhodium is dispersed and deposited in advance on said alumina-modified cerium oxide.

19. A catalyst according to claim 18, wherein rhodium is dispersed and deposited in advance on said alumina-modified cerium oxide and the obtained rhodium-containing cerium oxide is mixed with said active alumina and at least one precious metal selected from the group consisting of platinum and palladium.

20. A catalyst according to claim 18, wherein rhodium is dispersed and deposited in advance on said alumina-modified cerium oxide and at least one precious metal selected from the group consisting of platinum and palladium is dispersed and deposited in advance on said active alumina.

21. A catalyst according to claim 2, wherein at least one precious metal selected from the group consisting of platinum and palladium is dispersed and deposited fast on the powder through the medium of an impregnating liquid incorporating therein a polybasic carboxylic acid.

22. A catalyst according to claim 21, wherein said powder is active alumina.

23. A catalyst according to claim 22, wherein said polybasic carboxylic acid is added in an amount of 0.1 to 30 g, based on 100 g of said active alumina.

24. A catalyst according to claim 21, wherein said polybasic carboxylic acid is oxalic acid.

25. A catalyst according to claim 21, wherein said polybasic carboxylic acid is citric acid.

* * * * *